United States Patent Office 3,373,181
Patented Mar. 12, 1968

3,373,181
ALIPHATIC NITRAZA HYDRAZIDES AND PROCESSES FOR PREPARING NITRAZA DIISOCYANATES THEREFROM
Gustave B. Linden, Short Hills, N.J., and Karl Klager, Sacramento, Calif., assignors to Aerojet-General Corporation, Azusa, Calif., a corporation of Ohio
No Drawing. Filed May 21, 1962, Ser. No. 196,858
15 Claims. (Cl. 260—453)

This invention relates to novel nitraza hydrazides, and to the conversion of these nitraza hydrazides to nitraza diisocyanates.

It is an object of this invention to prepare novel nitraza hydrazides. Another object of this invention is to prepare nitraza diisocyanates by a method which is both simpler and safer than those previously known. These and other objects of this invention will appear hereinafter.

Heretofore the nitraza diisocyanates have been prepared by the reaction of nitraza diacyl halide with a metallic azide, followed by the decomposition of the diazide to form the desired diisocyanate. This method possesses a disadvantage in that the metallic azides are very impact sensitive. Therefore, this method of obtaining the nitraza diisocyanates is inherently dangerous. It has now been found that the nitraza diisocyanates can be prepared by method which does not involve the use of the metallic azides.

One of the starting materials in the preparation of the nitraza diisocyanates according to the method of this invention are the nitraza hydrazides of the following formula:

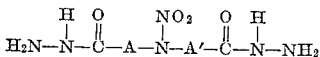

wherein A and A' are alkylene radicals, preferably lower alkylene radicals having from one to about ten carbon atoms, i.e., methylene, ethylene, pentamethylene, decamethylene, etc. These radicals may be branched or straight-chain. The nitraza hydrazides of the above formula are prepared in accordance with the following general equation:

I.

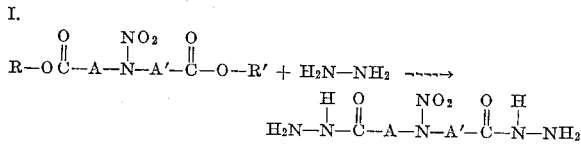

wherein A and A' are as defined above, and R and R' are the same or different, and are alkyl groups, preferably lower alkyl groups, such as methyl, propyl or octyl. This reaction is remarkable in view of the fact that heretofore it was thought that a strong base such as hydrazine when reacted with a nitro compound would cause the hydrolysis of the nitro group. The above reaction proceeds however without the occurrence of any substantial amount of reaction between the nitro group and the hydrazine.

Reaction I is conveniently carried out in any inert polar solvent in which the reactants are soluble, i.e., water, methanol, ethanol, etc. The proportions of the two reactants employed are not critical. Preferably the hydrazine is used in an amount stoichiometrically in excess of the amount of the ester employed so as to drive the reaction to completion within a reasonable length of time. The reaction temperature may be varied over a wide range. The preferred range is from 0° C. to about 120° C. As a practical matter, the reaction temperature can be the atmospheric boiling point of the solvent in which the reaction is carried out. For example, when ethyl alcohol is the solvent, the reaction is conducted at a temperature of around 75° to 80° C.

The novel nitraza hydrazides prepared in the above manner are converted to the nitraza diisocyanates as shown in the following reaction equations:

II.

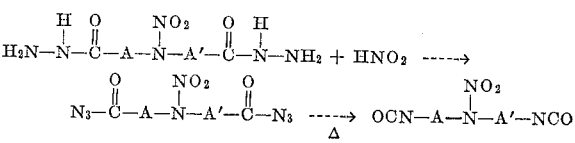

wherein A and A' are as defined above. It is to be understood that the nitrous acid employed in the above reaction can be formed in situ such as by the reaction of an alkali metal nitrite, i.e., potassium nitrite; with a mineral acid such as hydrochloric acid.

In the above Reaction II, the reactants are normally used in stoichiometrically equivalent amounts, since this results in the most complete utilization of the reactants. However, the proportions may be varied over a wide range without adversely affecting the reaction.

The preparation of the diazide is preferably carried out in a mixed solvent media. One solvent will normally be a polar solvent in which the nitraza hydrazide and the nitrous acid, or nitrous acid precursor, are soluble. Water is the preferred polar solvent. The other solvent is preferably non-polar, and therefore is immiscible with the polar solvent. The diazide is soluble in the non-polar solvent. This technique makes for ease of separation of the desired diazide from the polar solvent and excess reactants. Of the solvents for the diazides, the haloalkanes are preferred since they are non-flammable. The more preferred diazide solvent is chloroform. Thus the reaction of the nitraza hydrazide and nitrous acid yields the diazide in the non-polar phase.

Since diisocyanates are reactive with polar solvents, it is desirable that the reaction between the nitraza hydrazide and the nitrous acid be carried out at a temperature below the decomposition temperature of the diazide; preferably the reaction temperature is below about 50° C., and more preferably is from about —5° C. to about +5° C.

Upon completion of the diazide formation, the polar solvent phase can then be decanted. The non-polar phase containing the diazide dissolved therein can then be heated to reflux under anhydrous conditions, at which temperature the diazide rearranges to form the desired diisocyanate. Rearrangement normally occurs at a temperature above about 50° C.

Pressure is not critical in the preparation of either the nitraza hydrazide or the nitraza diisocyanate. Therefore, the reactions can be run at any pressure, atmospheric pressure being the most convenient.

The nitraza hydrazides and nitraza diisocyanates of this invention are normally solids and may be isolated in conventional manner by filtration, evaporation and/or crystallization.

To more clearly illustrate our invention, the following examples are presented. It is to be understood, however, that these examples are intended merely as illustrative embodiments of the invention and should not be construed as limitative of the scope of said invention in any way. In the examples percentages are by weight unless otherwise indicated.

*Example I.—Preparation of 4-nitraza-1,7-heptanedioyl hydrazide*

Dimethyl 4-nitraza-1,7-heptanedioate (0.05 mole) in 25 ml. ethanol was added to 6.5 ml. (0.2 mole) of anhydrous hydrazine, and the mixture was refluxed for 1.5 hours. The clear colorless solution was evaporated to dryness to yield an oil which soon crystallized. The 4-nitraza-1,7-heptanedioyl hydrazide which was obtained was recrystallized twice from methanol and found to have a melting point of 114–115° C.

*Analysis.*—Calc'd for $C_6H_{14}N_6O_4$: C, 30.77%; H, 6.02%; N, 35.88%. Found: C, 30.95%; H, 6.07%; N, 36.05%.

The dimethyl 4-nitraza-1,7-heptanedioate used in the above example is prepared by the reaction of 4-nitraza-1,7-heptanedioyl chloride with a stoichiometrically equivalent amount of methanol at room temperature. This ester can also be prepared by refluxing 4-nitraza-1,7-heptanedioic acid with methanol in the presence of an acid catalyst.

*Example II.—Preparation of 3-nitraza-1,5-pentane diisocyanate*

A solution of 0.1 mole of 4-nitraza-1,7-heptanedioyl hydrazide in 90 ml. of water and 100 ml. of chloroform was combined with 19 ml. of concentrated hydrochloric acid and 0.22 mole of potassium nitrite at 0 to 5° C. The chloroform layer was separated and dried over anhydrous $Na_2SO_4$. This solution of the diazide was filtered and heated to initiate the decomposition of the diazide. The decomposition was finished at reflux. The solution of the dissocyanate was evaporated to dryness. The oil obtained was taken up with 50 ml. of toluene and the 3-nitraza-1,5-pentane diisocyanate crystallized on cooling. It was found to have a melting point of 34–35° C.

Other nitraza hydrazides and nitraza diisocyanates can be prepared according to the above examples. For example, dimethyl 4-nitraza-1,10-decanedioate can be reacted with hydrazine to form 4-nitraza-1,10-decanedioyl hydrazide which in turn can be converted to 3-nitraza-1,8-octane diisocyanate by reaction with nitrous acid followed by heating. Similarly diethyl 3-nitraza-1,6-hexanedioate can be reacted with hydrazine to form 3-nitraza-1,6-hexanedioyl hydrazide which is then converted to the 2-nitraza-1,4-butane diisocyanate by reaction with nitrous acid followed by heating.

The nitraza hydrazides of this invention are inherently useful as explosives. The nitraza hydrazides are also physiologically active and can be employed in insecticidal and fungicidal compositions, such as by incorporation in an inert carrier. The diisocyanates produced in accordance with this invention react readily with nitroalcohols such as 2,2-dinitro ethanol, to produce valuable high explosive compositions as disclosed in U.S. Patent No. 2,978,486, issued Apr. 4, 1961.

It will be understood that various modifications may be made in this invention without departing from the spirit thereof or the scope of the appended claims.

We claim:

1. As a composition of matter, the compounds have the formula:

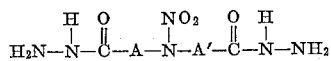

wherein A and A' are alkylene radicals.

2. The compounds of claim 1, wherein A and A' are lower alkylene radicals.

3. The compound 4-nitraza-1,7-heptanedioyl hydrazide.

4. The method of preparing compounds of the formula:

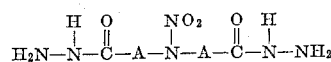

which comprises reacting hydrazine with a compound of the formula:

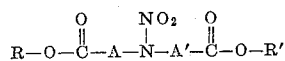

wherein A and A' in each of the above formulae are alkylene radicals, and R and R' are lower alkyl radicals, and isolating the product obtained.

5. The method of claim 4, wherein the reaction is carried out in a polar solvent.

6. The method of preparing 4-nitraza-1,7-heptanedioyl hydrazide which comprises reacting a stoichiometric excess of hydrazine with dimethyl 4-nitraza-1,7heptanedioate, and isolating the product obtained.

7. The method for preparing nitraza diisocyanates of the formula:

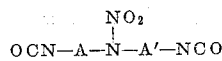

which comprises reacting nitrous acid with a compound of the formula:

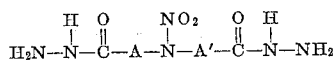

wherein in the above formulae, A and A' are alkylene radicals, to form the diazide, the reaction being carried out at a temperature below the decomposition temperature of said diazide, and subsequently heating the diazide thus obtained under anhydrous conditions to effect rearrangement to the nitraza diisocyanate.

8. The method of claim 7, wherein the reaction to produce the diazide is carried out in the presence of a mixed solvent comprising a polar solvent and a non-polar solvent.

9. The method of claim 8, wherein the polar solvent is water and the non-polar solvent is chloroform.

10. The method of claim 7, wherein the reaction to produce the diazide is carried out at a temperature below about 50° C.

11. The method of preparing 3-nitraza-1,5-pentane diisoyanate, which comprises reacting nitrous acid with 4-nitraza-1,7-heptanedioyl hydrazine to form the diazide, the reaction being carried out at a temperature below the decomposition temperature of said diazide, and subsequently heating the diazide thus obtained under anhydrous conditions to effect rearrangement to the 3-nitraza-1,5-pentane diisocyanate.

12. The method of claim 11, wherein the reaction to produce the diazide is carried out at a temperature below about 50° C.

13. The method of claim 11, wherein the reaction to produce the diazide is carried out in the presence of a mixed solvent comprising a polar solvent and a haloalkane.

14. The method of claim 12, wherein the polar solvent is water and the haloalkane is chloroform.

15. The method which comprises reacting hydrazine with a compound of the formula

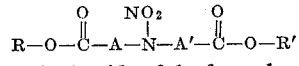

to form a nitraza hydrazide of the formula

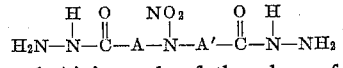

wherein A and A' in each of the above formulae are alkylene radicals, and R and R' are lower alkyl radicals, reacting said nitraza hydrazide with nitrous acid were to form the diazide, said reaction being carried out at a temperature below the decomposition temperature of said diazide, and subsequently heating the diazide under anhydrous conditions to effect rearrangement to the nitraza diisocyanate of the formula

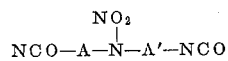

wherein the above formula A and A' are alkylene radicals.

References Cited

UNITED STATES PATENTS

| | | | |
|---|---|---|---|
| 2,967,198 | 1/1961 | Frankel | 260—561 |
| 3,000,920 | 9/1961 | Frankel | 260—453 |
| 3,000,941 | 9/1961 | Klager | 260—561 |
| 3,070,618 | 12/1962 | Drummond | 260—453 |
| 2,978,486 | 4/1961 | Frankel | 260—453 X |
| 2,978,504 | 4/1961 | Frankel et al. | 260—561 X |

CHARLES B. PARKER, *Primary Examiner.*

L. D. ROSDOL, C. D. QUARFORTH, *Examiners.*

J. W. WHISLER, L. A. SEBASTIAN, D. H. TORRENCE, *Assistant Examiners.*